United States Patent
Niebauer et al.

(10) Patent No.: US 7,856,329 B2
(45) Date of Patent: Dec. 21, 2010

(54) METHOD AND APPARATUS FOR PROCESSING AN UNDER-SAMPLED CHIRPED SINUSOIDAL WAVEFORM USING A COMPLEX-HETERODYNE

(76) Inventors: Tim Niebauer, 7973 Grasmere Dr., Boulder, CO (US) 80301; Aaron Schiel, 1130 Cardinal Ave., Brighton, CO (US) 80601; Derek Van Westrum, 325 28th St., Boulder, CO (US) 80305

( * ) Notice: Subject to any disclaimer, the term of this patent is extended or adjusted under 35 U.S.C. 154(b) by 0 days.

(21) Appl. No.: 11/733,456

(22) Filed: Apr. 10, 2007

(65) Prior Publication Data

US 2008/0046185 A1 Feb. 21, 2008

Related U.S. Application Data

(60) Provisional application No. 60/744,532, filed on Apr. 10, 2006.

(51) Int. Cl.
*G01V 7/00* (2006.01)
(52) U.S. Cl. .............................. 702/66; 702/67; 702/70; 702/71; 702/73; 702/74; 702/75; 702/76; 73/382 R; 73/382 G
(58) Field of Classification Search ............. 702/69–76, 702/66, 67; 73/382 R, 382 G
See application file for complete search history.

(56) References Cited

U.S. PATENT DOCUMENTS

| 5,637,797 A | * | 6/1997 | Zumberge et al. | ......... 73/382 R |
| 7,019,839 B2 | * | 3/2006 | Szafraniec | ................. 356/484 |
| 2006/0193372 A1 | * | 8/2006 | McCorkle et al. | ........... 375/130 |

OTHER PUBLICATIONS

Niebauer, et al., "A New Generation of Absolute Gravimeters," *Metrologia*, vol. 32 (3), pp. 159-180, 1995.
Murata, "A Transportable Apparatus for Absolute Measurement of Gravity", *Bulletin of the Earth-quake Research Institute* 53: 49-130, 1979.
D'Agostino, et al., "A Method to Estimate the Time-Position Coordinates of a Free Falling Test-Mass in Absolute Gravimetry," *Metrologia*, 42 (2005) 233-238.

* cited by examiner

*Primary Examiner*—Sujoy K Kundu
(74) *Attorney, Agent, or Firm*—Connolly Bove Lodge & Hutz LLP

(57) ABSTRACT

A method of processing data acquired by under-sampling a chirped, sinusoidal waveform comprises complex-heterodyning the under-sampled data with a chirped signal having characteristics similar to the sinusoidal waveform to generate a demodulated signal and analyzing the demodulated signal to determine characteristics of the sinusoidal waveform.

28 Claims, 7 Drawing Sheets

METHOD AND APPARATUS FOR PROCESSING AN UNDER-SAMPLED CHIRPED SINUSOIDAL WAVEFORM USING A COMPLEX-HETERODYNE

CROSS-REFERENCE TO RELATED APPLICATIONS

This application claims the benefit of U.S. Provisional Application No. 60/744,532 to Niebauer et al. filed on Apr. 10, 2006, the content of which is incorporated herein by reference.

FIELD OF THE INVENTION

The present invention relates generally to signal processing and in particular, to a method and apparatus for processing an under-sampled chirped sinusoidal waveform using a complex-heterodyne.

BACKGROUND OF THE INVENTION

Many instruments create an electronic signal that contains a frequency sweep or "chirp" that must be characterized. The frequency-swept optical signal generated by an absolute gravity meter provides a good example. Turning now to FIG. 1, the optical layout for a conventional absolute gravity meter in which one arm of a Michelson interferometer is in free-fall and the other arm of the interferometer is stationary, is shown. The light output L of a frequency-stabilized laser 10 is split into two beams $B_1$ and $B_2$ by a partially reflecting mirror or "beam splitter" 12. One of the beams $B_1$ is reflected by the beam splitter 12 onto a mirror 14 in freefall. The other beam $B_2$ passes through the beam splitter 12 and is reflected back towards the beam splitter 12 by a stationary mirror 16. The beam $B_1$ reflected by the mirror 14 passes through the beam splitter 12 and is recombined with the beam $B_2$ reflected by the mirror 16 to yield a return beam R. The return beam R impinges on a photodiode detector 18 resulting in an interference signal being generated. The interference signal exhibits a complete cycle of constructive and destructive interference whenever the paths of the two beams $B_1$ and $B_2$ change by one-half of the laser wavelength ($\lambda/2$). This change in intensity of the interference signal is referred to as a "fringe".

As the mirror 14 accelerates, optical fringes are formed at the photodiode detector 18. The frequency of the interference signal depends upon the velocity of the mirror 14 according to Equation (1) below:

$$f = 2v/\lambda = 2gt/\lambda \tag{1}$$

The mathematical form of the interference signal is a swept sinusoid for a Michelson-type interferometers Gravity causes the velocity of the falling mirror 14 to increase linearly with time. This in turn causes the frequency of the interference signal to increase as the mirror 14 falls. Initially, when the velocity of the mirror 14 is nearly zero, the fringe frequency is close to zero or DC but rises rapidly as the mirror 14 accelerates. As an example, using red laser light which has a frequency in the order of 633 nm and a typical drop distance of about 20 cm, the frequency will sweep (or "chirp") from DC to approximately 6 MHz over the 0.2 s it takes the mirror 14 to fall. The interference signal V(t) is represented by Equation (2) below:

$$V(t) = A\sin\left[\frac{4\pi}{\lambda}\left(x_0 + v_0 t + \frac{1}{2}gt^2\right)\right] \tag{2}$$

where:

$x_0$ and $v_0$ are the initial position and velocity of the mirror; and g is the gravitational acceleration of a freely falling body.

As will be appreciated by those of skill in the art, the interference signal is a challenging signal to measure because it is spread over a large bandwidth in the frequency domain but is only present for a short amount of time.

Traditionally, this interference or chirped signal has been analyzed using a method that measures time intervals between zero-crossings of the interference signal. FIG. 2 shows an interference signal generated by the absolute gravity meter of FIG. 1 and its zero-crossing times. Because each zero-crossing corresponds to the mirror 14 falling a distance equal to $\lambda/2$, the time and distance for each zero-crossing are related by Equation (3) for constant acceleration as expressed below:

$$x_n = n\frac{\lambda}{2} = \frac{1}{2}gt_n^2 \tag{3}$$

A linear least-squares analysis is used to fit for the unknown gravity value. Typically, an arbitrary initial mirror position and initial mirror velocity are included in the fit to allow for offsets in the mirror position and non-zero initial velocity. The model function also usually includes small corrections due to frequency modulation of the laser, gradient of gravity, and even a correction due to the finite speed of light as described in the publication entitled "A New Generation of Absolute Gravimeters", authored by Niebauer et al., Metrologia Vol. 32, Num. 3, 1995.

One advantage of the above zero-crossing method is that the fit is linear in the parameters of initial position, velocity, and acceleration of the mirror 14. Another advantage is that the result is, in principle, independent of the amplitude of the interference signal. The zero-crossing method was feasible even before the advent of very fast computers as little data is required to make the fit and time interval analyzers that could make high speed time measurements were available in the early 1970s. For example, the JILAG series of absolute gravity meters (1980-1985) typically scaled the zero-crossings by about 4000 so that only about 100 points were fit during each mirror drop. The FGS absolute gravity meter (2005) typically uses about 600-700 data points per mirror drop. Higher data acquisition rates are possible, but the effect on noise reduction is minimal because of small systematic errors in the interference signal.

Although the zero-crossing method presents some advantages, there are several disadvantages associated with the zero-crossing method. In particular, the acquired data are equally spaced in mirror freefall distance but are not equally spaced in the time domain. This makes it difficult to study certain types of noise or look for vibration signals in the time domain. Another difficulty is that the zero-crossing detection system must avoid double triggering and therefore, requires a relatively clean input interference signal. This puts a lower limit on the amount of light needed in the interferometer for the instrument to function properly.

Another technique used to analyze au interference signal digitizes the interference signal and then fits the data for the amplitude, the initial phase, the initial frequency, and the frequency chirp of the interference signal. This technique was firstly employed in an absolute gravity meter in 1979 as described in the publication entitled "A Transportable Apparatus for Absolute Measurement of Gravity" authored by Murata, Bulletin of the Earth-quake Research Institute 53: 49-130, 1979. As described, very accurate photographs of an interference signal waveform on an oscilloscope were analyzed and digitized by hand. The procedure was obviously slow and tedious, but it did accomplish the task of determining gravity.

Digitizing the interference signal waveform has become more attractive as the technology of analog-to-digital (A/D) converters has advanced. Currently it is possible to digitize an interference signal waveform at frequencies close to 1 GHz, and high speed computers can now automate the non-linear fitting routines needed to determine gravity. However, it is important to note that a large dynamic range is also needed as typical gravity meters try to reach a resolution in the order of $10^{-9}$ or even $10^{-10}$ g in one mirror drop.

U.S. Pat. No. 5,637,797 to Zumberge et al. describes digitizing an interference signal waveform automatically using a fast A/D personal computer (PC) card, but sampling well below Nyquist (1 MHz). A standard non-linear least-squares fit to Equation (1) is performed. The mirror velocity term appears as an initial frequency, and the gravity term is the frequency chirp. Unfortunately, it is extremely difficult to provide initial estimates of the velocity and gravity accurately enough so that the non-linear fit will converge. This becomes increasingly difficult as the sampling frequency is decreased. Zumberge et al. determines apparent zero-crossings and uses first differences of mean-time for zero-crossings to deduce the initial velocity and acceleration (equivalent to initial frequency and chirp) in the time domain. Apparently, 85,000 points from a single drop in 5.3 s can be fit with a 50 MHz 80486 personal computer.

The publication entitled "A Method to Estimate the Time-Position Coordinates of a Free-Falling Test-Mass in Absolute Gravimetry" authored by D'Agostino et al., Metrologia 42 (2005) 233-238 discloses a similar method but where the interference signal waveform is digitized above Nyquist at 50 MHz. Unfortunately, both the Zumburge et al. and D'Agostino et al. methods require very large amounts of data and a large number of operations in order to determine accurately the parameters in the nonlinear least-square's fit. For example, if one (1) million points are sampled during each mirror drop, about 2 MB of data storage is needed. In a typical absolute gravity measurement, such a mirror drop is performed every ten (10) seconds, resulting in 1 GB of data being generated every three (3) hours. Even with modern computers, the algorithms proposed by Zumberge et al. and D'Agostino et al. can take many seconds to process one measurement. For example, as D'Agostino et al. state " . . . the program processes about 750 windows of the interference signal in about 35 s on the adopted computer, which has 1 GB of RAM and uses a 1.8 GHz Pentium IV processor."

As will be appreciated, improvements in measuring chirped signals such as an interference signal generated by an absolute gravity meter are desired. It is therefore an object of the present invention to provide a novel method and apparatus for processing an under-sampled chirped sinusoidal waveform using a complex-heterodyne.

SUMMARY OF THE INVENTION

Accordingly, in one aspect there is provided a method of processing data acquired by under-sampling a chirped, sinusoidal waveform comprising complex-heterodyning the under-sampled data with a chirped signal having characteristics similar to the sinusoidal waveform to generate a demodulated signal; and analyzing the demodulated signal to determine characteristics of the sinusoidal waveform.

The chirped sinusoidal waveform may be an interference signal S(t) and take the form:

$$S(t) = A\cos\left(\omega_0 t + \frac{1}{2}\alpha t^2\right)$$

where $\omega_o$ is the initial frequency of the interference signal and $\alpha$ is the chirp of the interference signal.

In this case, during the analyzing, values for the initial frequency and chirp of the sinusoidal waveform are determined. A least-squares fit can then used or a series of complex-heterodynes can be performed to refine the determined initial frequency and chirp values.

The chirped sinusoidal waveform is under-sampled below Nyquist. The under-sampled data can be processed in real-time during under-sampling of the chirped sinusoidal signal. Alternatively, the under-sampled data can be retrieved from storage and processed. The data processing can be embodied in virtually any system or meter where a chirped sinusoidal signal is to be analyzed.

For example, the above data processing may be used to analyze data acquired by under-sampling a chirped sinusoidal waveform generated in any interferometer application such as for example a wave meter, an absolute gravity meter etc. or a chirped sinusoidal waveform transmitted into the ground such as in seismic and surveying applications. When the data processing is embodied in the equipment used to acquire the data, real-time processing and analysis of the under-sampled data is permitted.

During data acquisition, a conventional anti-aliasing filter is either not employed or if employed, is selected to have a high bandwidth well beyond the typical cut-off frequency (½ of the sampling rate) for conventional anti-aliasing filters. As will be appreciated, it is common practice to use an anti-aliasing filter that cuts off frequencies higher that the Nyquist frequency in order to reduce noise. Doing so however, reduces bandwidth and thus removes information from the sampled waveform that cannot be recovered. By avoiding use of or employing an anti-aliasing filter having a cut-off well above the typical cut-off frequency, signals having frequencies much higher than the sampling frequency that may include important information can be analyzed.

According to another aspect there is provided a signal processor for processing under-sampled data extracted from a chirped sinusoidal waveform comprising a multiplier multiplying the under-sampled data with a chirped signal having characteristics similar to the sinusoidal waveform to generate a demodulated signal; and a signal analyzer analyzing the demodulated signal to determine selected characteristics of the sinusoidal waveform.

According to yet another aspect there is provided a method of extracting selected characteristics of a chirped, sinusoidal waveform comprising under-sampling the sinusoidal waveform below Nyquist in the absence of all anti-aliasing filter having a bandwidth generally at the typical cut-off rate; and processing the under-sampled data using at least one complex-heterodyne to determine the selected characteristics.

BRIEF DESCRIPTION OF THE DRAWINGS

Embodiments will now be described more fully with reference to the accompanying drawings in which.

DETAILED DESCRIPTION OF THE EMBODIMENTS

Figure 1:
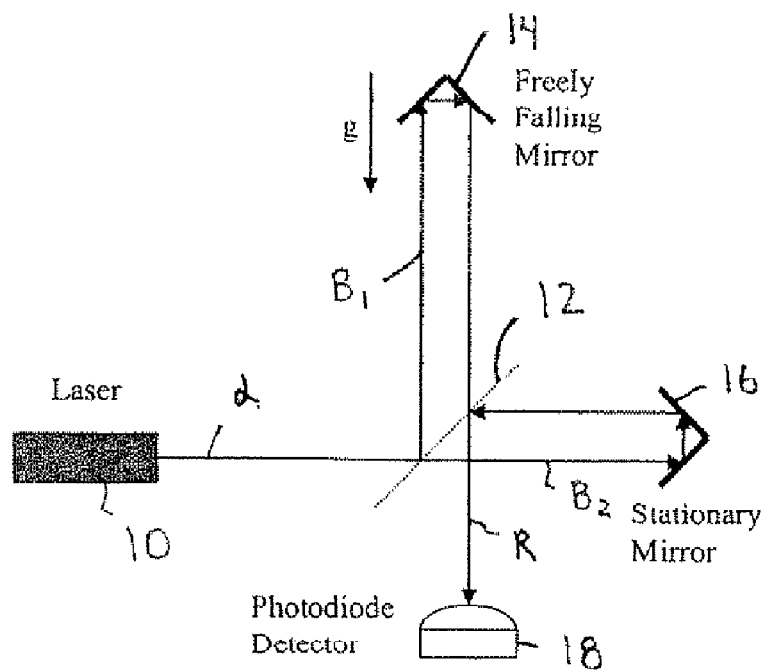
FIG. 1 is a schematic diagram of a conventional absolute gravity meter.
Figure 2:
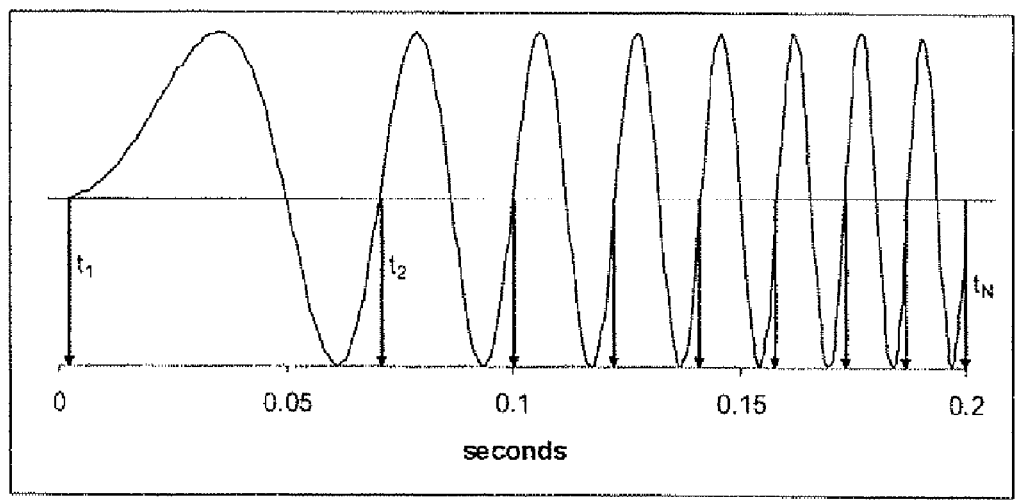
FIG. 2 is an interference signal generated by the absolute gravity meter of FIG. 1.

In the following description, a method of processing data acquired by under-sampling a chirped, sinusoidal waveform is provided. The under-sampled data is complex-heterodyned with a chirped signal having characteristics similar to the sinusoidal waveform to generate a demodulated signal. The demodulated signal is analyzed to determine characteristics of the sinusoidal waveform. During the analyzing, values for the initial frequency and the chirp of the sinusoidal waveform are determined. A least-squares fit can then be used or a series of complex-heterodynes can be performed to refine the determined initial frequency and chirp values. The chirped sinusoidal waveform is under-sampled below the Nyquist. The under-sampled data can be processed in real-time during under-sampling of the chirped sinusoidal signal or alternatively, the under-sampled data can be retrieved from storage and processed. During data acquisition, a conventional anti-aliasing filter is either not employed or if employed, is selected to have a high bandwidth well beyond the typical cut-off frequency for conventional anti-aliasing filters. Although noise is traded off for bandwidth, by doing so, signals having frequencies much higher than the sampling frequency that may include important information can be analyzed. The data processing may be used to analyze data acquired by under-sampling a chirped sinusoidal waveform generated in any interferometer application such as for example a wave meter, an absolute gravity meter etc. or a chirped sinusoidal waveform transmitted into the ground such as in seismic and surveying applications. When the data processing is embodied in the equipment used to acquire the data, realtime processing and analysis of the under-sampled data is permitted. For ease of reference, data acquisition and processing of a chirped sinusoidal waveform in the form of an interference signal generated by an absolute gravity meter will now be described.

The chirped sinusoidal waveform S(t) of an absolute gravity meter has the form given by Equation (4) below:

$$S(t) = A\cos\left(\omega_0 t + \frac{1}{2}\alpha t^2\right), \qquad (4)$$

where:

$w_0 = 2\lambda f_0$ represents the initial frequency; and $\alpha$ represents the linear chirp or change of frequency.

The typical start frequency for such a chirped signal is somewhere between DC and 100 kHz, while the final frequency is about 6 MHz after a time of 0.2 s. The chirp to 1 part in $10^9$ with as few as 100 points, sampled equally in time along the entire sinusoidal chirped waveform, using the subject method can be determined using complex-heterodyning although for noisier signals, greater than 1000 points should be used.

In one embodiment, during the method, a complex-heterodyne is used to determine initial values for mirror velocity and chirp frequency parameters to within one frequency bin of resolution, and then a non-linear least-squares fit of Equation (4) in the time domain is employed to refine the solution. The least-squares fit converges rapidly once the initial guesses for the mirror velocity and chirp frequency parameters have been determined by complex-heterodyning. Although complex-heterodyning in the frequency domain can be used exclusively without the need to go to the time domain, employing a least-squares fit in the time domain as a final step has proven to be efficient. The typical processing time on a Pentium IV processor is about 0.1 s/drop using MatLab FFT routines. Furthermore, the data storage requirements are about 1000 times lower as compared to methods that process data sampled at high rates.

A sinusoidal chirped waveform that is sweeping in frequency from DC to 6 MHz in 0.2 s has about 600,000 cycles. Taking 1000 equally spaced samples results in a vast majority of the waveform cycles not being sampled at all. Plotting the under-sampled waveform in the time domain, or the Fourier transform in the frequency domain, results in what appears to be random numbers. Of course, the data are not really random because they correspond to points on the curve described by Equation (2).

By complex-heterodyning the under-sampled waveform with a sinusoidal chirp signal that has similar characteristics to the input chirped sinusoidal waveform, the information in the under-sampled waveform can be brought down to a low frequency and ultimately to DC. The resulting demodulated signal can then be analyzed to determine corrections to the initial frequency and chirp parameters of the heterodyne function. This procedure works even though the initial waveform is extremely under-sampled. Compared with standard methods of analysis, complex-heterodyning an under-sampled waveform significantly reduces the amount of sample data, processing time, and storage needed while preserving the necessary information to fully analyze the original signal waveform.

For case of understanding, a known technique for bringing a high frequency down to a low frequency by heterodyning an input signal by a sinusoidal function that is close to the frequency of the input signal will now be described. This technique is also known as demodulation in communication applications. For example, consider an audio signal specified by a function A(t). In a simple amplitude modulation (AM) scheme, the signal A(t) is multiplied by a carrier frequency, $\omega_c$, resulting in a waveform, $S(t)=A(t)\cos(\omega_c t)$. Typically the carrier frequency is much higher than the bandwidth of the amplitude modulation. This allows one to broadcast many different signals simultaneously by transmitting them each at a different carrier frequency. In order to recover the original signal A(t) at the receiver, the signal S(t) must be demodulated by heterodyning the signal S(t) with another sinusoidal signal having a frequency, $\omega_h$, near to or ideally exactly at the carrier frequency, $\omega_o$. The demodulated signal D(t) can be written as:

$$D(t) = A(t)\cos(\omega_c t)\cos(\omega_h t) \quad (5)$$
$$= \frac{1}{2}A(t)(\cos[(\omega_c - \omega_h)t] + \cos[(\omega_c + \omega_h)t])$$

The heterodyning process thus produces two signals, one signal at the sum of the heterodyne and carrier frequencies, $\omega_c+\omega_h$, and the other signal at the difference of the heterodyne and carrier signals, $\omega_c-\omega_h$. If the heterodyne and carrier frequencies are exactly equal, then the original signal, A(t), can be recovered at the difference frequency which is then precisely zero (DC). The other term with the sum of the frequencies (approximately double the original carrier frequency) can easily be removed or separated from the original signal A(t) by low pass filtering.

There are situations in which the heterodyne procedure described above mixes frequencies that cannot later be separated from the frequencies of interest. For example, consider a signal S(t) made of two frequencies expressed by Equation (6) below:

$$S(t)=A\cos(\omega_1 t)+B\cos(\omega_2 t) \text{ where } \omega_2>\omega_1 \quad (6)$$

and a heterodyne signal h(t) consisting of a sinusoidal function with a frequency, $\omega_h$, given by Equation (7) below:

$$h(t)=A_h \cos(\omega_h t) \quad (7)$$

The demodulated signal D(t) is represented by Equation (8) below:

$$D(t)=h(t)S(t)=(A\cos(\omega_1 t)+B\cos(\omega_2 t))A_h \cos(\omega_h t) \quad (8)$$

The resultant demodulated signal contains four terms. Two terms have the sum and two terms have the difference of the heterodyne frequency with each of the original two frequencies. If the heterodyne frequency is exactly equidistant between the two frequencies in the signal S(t), then the two difference frequencies will be overlapped and cannot then later be separated.

This problem of mixing so-called "mirror frequencies" can be understood in the frequency domain by considering the convolution between the Fourier transform of the signal S(t) with the heterodyne signal h(t). Appendix A shows that the value of the convolution at $\Delta f=f_2-f_h=f_h-f_1$ will comprise two terms; one term that comes from multiplying the positive frequencies of $f_h$ and $f_2$ and the other term that comes from the product of the negative frequencies of $f_h$ and $f_1$. Once these frequencies are mixed, they are impossible to separate.

Appendix A also shows that this mixing of mirror frequencies can be avoided if the heterodyne signal contains only the positive frequency component of the heterodyne, explaining why a complex-heterodyne function is typically superior to a standard, real heterodyne for cases in which the heterodyne signal and original signal are not perfectly matched (i.e. especially where the original signal has a significant number of mirror frequencies around the heterodyne signal). Even in the case where there are no mirror frequencies in the original signal, complex-heterodyning avoids mixing noise from the mirror frequencies. Using a complex-heterodyne function of the form $h(t)=e^{i\omega_h t}$, it is possible to bring the signal frequency down, without mixing mirror frequencies together. Also as shown in Appendix A, complex-heterodyning with a positive frequency component simply shifts the entire signal spectrum to the left and with a negative frequency component simply shifts the entire signal spectrum to the right. The Fourier transform itself can be thought of as the combination of a complex-heterodyne (the exponential term) followed by a low pass filter (the integral) that isolates the component of the signal at the frequency of interest.

Complex-heterodyning has been described in connection with a data compression technique in which some limited bandwidth of a signal can be shifted to a low frequency, low-pass filtered, and then re-sampled at a lower frequency. In this case, the low pass filter is used to remove frequencies above the Nyquist frequency of the re-sampled signal. This filter is desired to avoid aliasing or mixing of frequencies due to the re-sampling procedure. The compressed data contains all of the same information as the original data but is shifted to a lower frequency. As described in the publication entitled "Pulsar Search Using Data Compression With the Garcbing Gravitational Wave Detector" by Niebauer et al., Phys. Rev. D, 47, 3106-3123 (1993), this procedure was used to compress data from a gravity wave detector to greatly reduce the processing time required for a full sky search on 100 hours of data collected at 10 kHz. The complex-heterodyne was used to apply further demodulation on the reduced data set to account for Doppler shifts for sources in different areas of the sky using another complex-heterodyne given by Equation (9) below:

$$h(t)=e^{i\phi(t)} \quad (9)$$

where:

ø(t) describes the phase shift caused by the time delay between the pulsar and the detector that is situated on a moving earth.

In general, the phase of the complex-heterodyne can be any function. Because phase shifts are simply additive, successive complex-heterodynes can be applied without regard to the order of application or the amount of phase shift. In this way, one can iteratively improve the phase tracking until the complex-heterodyne perfectly matches the original signal. The demodulation can be considered complete once all of the signal power is demodulated into one bin, at zero frequency (DC). However, complex-heterodyning can even be used to move the signal within one bin.

A chirped signal provides a good example of a signal that can be demodulated with a complex-heterodyne using a sinusoidal waveform with a time-dependent frequency. As an example, consider again the case of the chirped signal given by Equation (2). Here $\omega_0$ is an initial baseline frequency and at is the chirp or the linear change in the frequency as a function of time (i.e. $\alpha=d\omega/dt$). The signal S(t) can also be represented as the sum of two complex numbers using Euler's identity given by Equation (10) below:

$$S(t) = \cos(\phi_0(t)) = (e^{i\phi_0(t)} + e^{-i\phi_0(t)})/2 \quad (10)$$

where:

$$\phi_0 = \omega t + \frac{1}{2}\alpha t^2.$$

If the signal is demodulated by multiplying it with a chirped, complex-heterodyne signal, given by Equation (11) below:

$$h(t) = e^{i(\phi_h(t))} \quad (11)$$

where:

$$\phi_h(t) = \omega_h t + \alpha_h t^2,$$

a demodulated signal D(t) is obtained that is represented by Equation (12) below:

$$D(t) = e^{i(\phi_0(t) - \phi_h(t))} - e^{-i(\phi_0(t) + \phi_h(t))} \quad (12)$$

If the time variation of the phase of the complex-heterodyne function is close to the time variation of the phase of the original signal S(t) (i.e. if the baseline frequency and chirp are similar), then the difference term in the demodulated signal D(t) can be made to vary slowly in time. In fact, the difference term can be made to be completely "stationary", or time independent, when the complex-heterodyne function matches the original signal S(t).

Figure 3:
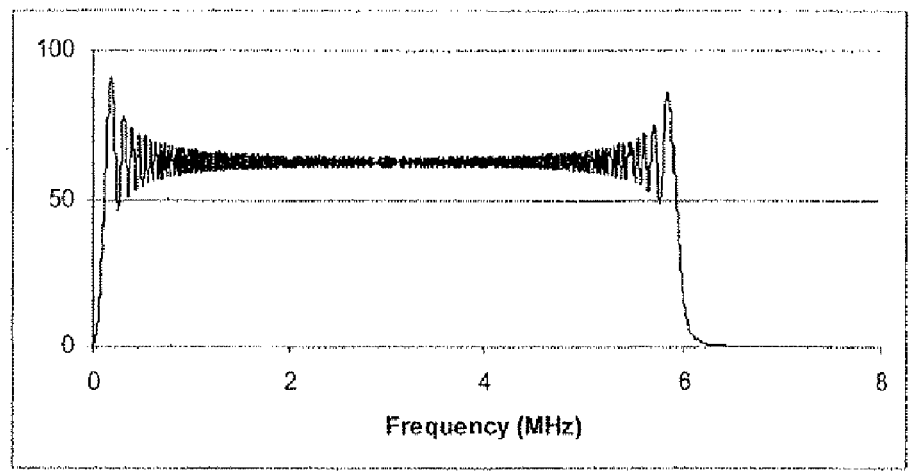
FIG. 3 is the power spectrum of a chirped sinusoidal waveform given by Equation (2) with a frequency varying from zero to 6 MHz over 0.2 s.

The power spectrum of a digitized frequency-swept sine wave appears as an almost flat band of frequencies, as long as the highest frequency in the chirp is less than one half of the Nyquist frequency of the sampled waveform. FIG. 3 shows the power spectrum for a signal that sweeps from DC to 6 MHz sampled at a frequency of 15 MHz (the Nyquist frequency is at 7.5 MHz).

The waveform is considered under-sampled if the chirped signal has frequencies that are higher than the Nyquist frequency (half of the sampling frequency). Any frequencies above the Nyquist frequency will be aliased and mixed back with the other lower frequencies. When the waveform is highly under-sampled, then the aliased frequencies appear as almost constant noise spread throughout the power spectrum.

Figure 4:
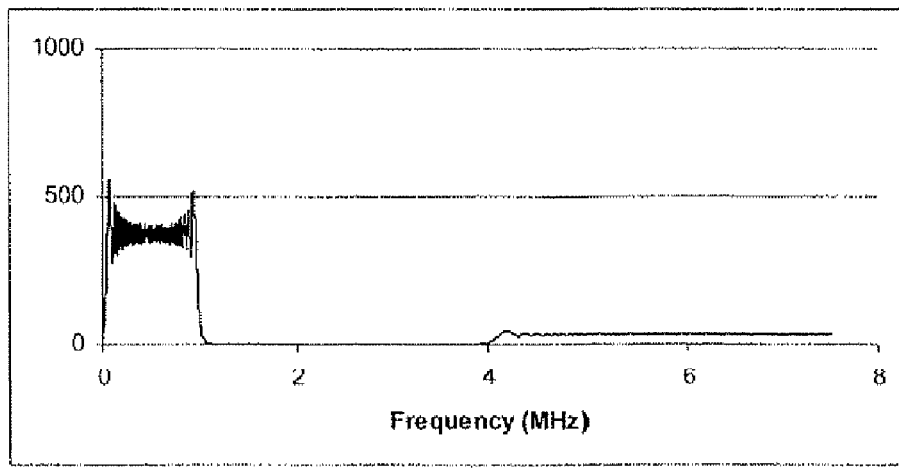
FIG. 4 is the power spectrum of a chirped sinusoidal waveform with a chirped frequency varying from DC to 6 MHz multiplied by a complex-heterodyne with a chirp ranging from DC to 5 MHz.

A complex-heterodyne having a chirped frequency similar to the original signal will produce a demodulated signal having a term containing the difference of the two chirps. FIG. 4 shows the same chirped signal as in FIG. 3 except that it has been demodulated using a complex-heterodyne that chirps from DC to 5 MHz.

Figure 5:
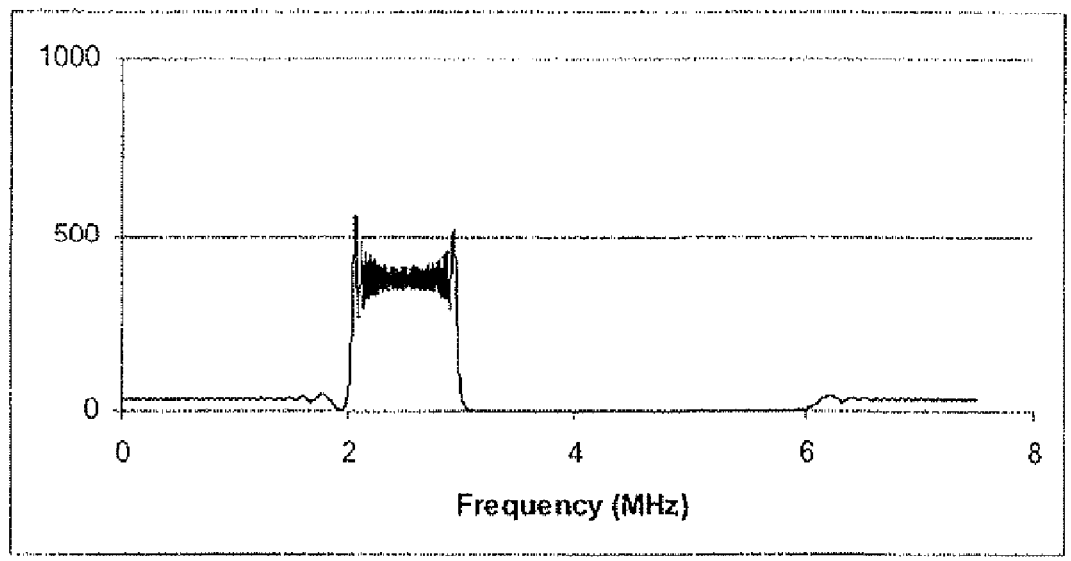
FIG. 5 is the spectrum of a complex-heterodyned signal with a 2 MHz offset.

While the width of the signal in the spectrum is given by the difference in the chirp sweep rates of the two signals, the offset in the frequency spectrum of the demodulated chirped signal is given by the difference in the initial frequency of the signal and heterodyne chirp. This means that the position of the chirped band can be moved by changing the initial frequency of the complex-heterodyne. FIG. 5 shows the same DC to 6 MHz signal heterodyned with a complex-heterodyne that is chirping from 2 MHz to 5 MHz in the same amount of time (0.2 s).

Figure 6:
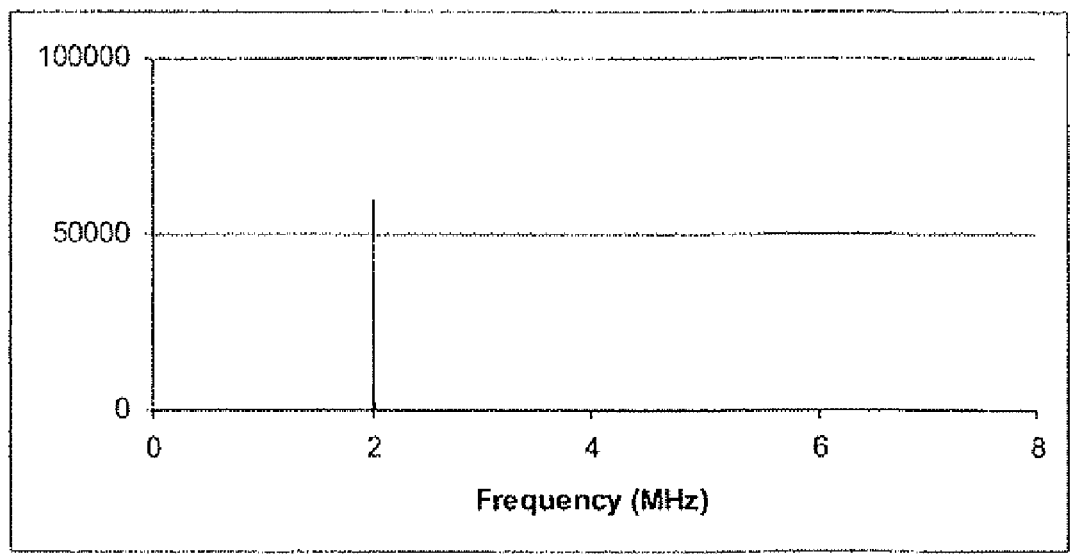
FIG. 6 is a demodulated waveform with a complex chirped heterodyne signal ranging from 2 MHz to 5990 kHz in 0.2 s.

Since complex-heterodynes are additive, multiple complex-heterodynes can be iteratively applied to move the signal to any bin in the frequency domain and/or to make it more narrow. As the heterodyne chirp frequency is brought closer to that of the original signal, the power of the difference term becomes concentrated into fewer frequency bins. It therefore becomes easier to identify the bandwidth of the chirp in the demodulated signal. FIG. 6 shows the same 15 MHz sampled chirped signal with frequency from zero to 6 MHz demodulated with a complex-heterodyne with frequency chirp given by 2 MHz to 5.990 MHz.

As the complex-heterodyne is brought closer to the original chirp, the bandwidth of the difference term is made smaller and smaller while the signal power in this band increases. Operationally, the bandwidth of the difference-frequency signal in the demodulation is estimated from the power spectrum and then used to adjust the heterodyne chirp signal to iteratively narrow the bandwidth of the demodulated signal. Alternatively, another complex-heterodyne can be applied to the demodulated signal since the complex phase from successive demodulations simply adds. This process converges quite rapidly so that after a few iterations all of the power of the difference term can be brought into one bin. At this point, the signal-to-noise ratio is maximized.

Figure 7:
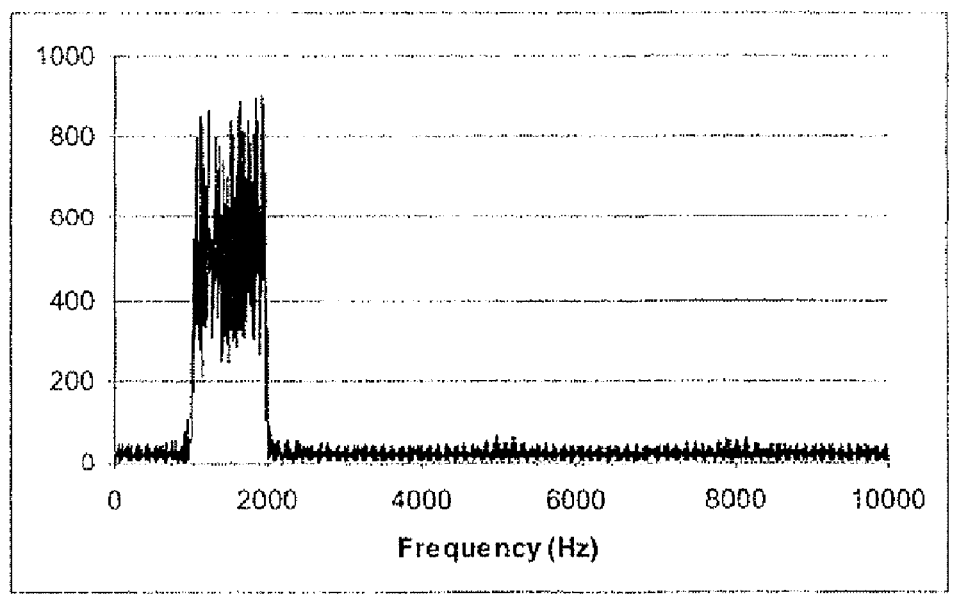
FIG. 7 is an under-sampled waveform after demodulation with a chirped complex-heterodyne signal.

FIG. 7 shows the result of a complex-heterodyne on a chirped signal that starts at DC and sweeps to 6 MHz over 0.2 s. The waveform is under-sampled at 20 kHz and then demodulated using a complex-heterodyne that chirps from 1 kHz to 5.999 MHz. The initial frequency of 1 kHz was chosen to move the chirp band away from DC for visual purposes in the figure.

Although it is possible to use a non-complex heterodyne to perform a similar demodulation, the demodulated waveform will have approximately twice the bandwidth and about one-half of the signal-to-noise ratio. The signal-to-noise ratio will in fact be less than one-half because each difference frequency is made from two mirror frequencies in the original spectrum. Differences in phase between the two mirror frequencies will further lower the amplitude of the demodulated difference signal.

The lowest necessary sampling frequency is a function of the initial frequency, how well the chirp frequency parameter is known, and how much noise is in the data set. The first constraint has to do with the fact that initial frequencies that are integer multiples of the sampling frequency will result in exactly the same sampled data (i.e. aliasing). For example, using the chirp model that sweeps from DC to 6 MHz in 0.2 s, and further assuming an uncertainty of the start time synchronization to 1 ms, then there may exist an initial frequency as large as 30 kHz. This indicates that for this case, a sample rate of 60 kHz is necessary to avoid an ambiguity in the initial start frequency.

The next constraint has to do with the knowledge of the chirp frequency. If the bandwidth of the chirp is defined as the difference between the highest and lowest frequency, then the sampling frequency should be at least twice this bandwidth. The standard example would normally call for a minimum sampling frequency of 12 MHz. However, a priori knowledge of the chirp reduces the bandwidth of the demodulated chirp after the complex-heterodyne. This allows the initial waveform to be under-sampled by the same factor. For example, if the chirp is known to 0.1%, then the sampling frequency can be reduced by a factor of 1000.

With respect to the last constraint, enough points should be chosen so that there is enough signal-to-noise to reach the desired accuracy. Typically, the uncertainties on the parameters will be reduced by the square root of the number of data points fit. So while it is possible to fit a strongly chirped signal with very few data points with a priori knowledge of the chirp, one may actually choose to measure more points (i.e. choose a higher sampling frequency) in order to obtain higher precision on both the initial frequency and chirp.

In cases where the initial frequency is not of interest and a good a priori knowledge of the chirp is known, the minimum frequency constraint can be relaxed, and very few points can be used to analyze the under sampled waveform. In the example of the absolute gravity meter signal discussed with reference to FIG. 1, one typically knows the value of gravity at any site to better than 0.1%, and the initial velocity of the mirror is of no interest. In this case, there is no problem if the initial velocity is aliased to a lower frequency. Thus, even though the interference signal from the gravity meter sweeps from DC to 6 MHz in 0.2 s, one can safely under-sample this waveform at 12 kHz. Over the 0.2 s freefall, a 12 kHz sampling rate will thus produce only about 2,400 data points.

When under-sampling an input chirped sinusoidal signal at the chosen sampling rate, a standard anti-aliasing filter should not be used. Any filter employed must preserve the bandwidth of the chirped sinusoidal waveform before sampling.

When analyzing an under-sampled sinusoidal waveform, in this embodiment the sampled data is demodulated using a complex-heterodyne of the form expressed by Equation (13) below:

$$h(t) = e^{i(\phi_h(t))} \tag{13}$$

where:

$$\phi_h(t) = \omega_h t + \alpha_h t^2$$

The initial frequency and chirp of the complex-heterodyne should be close enough to the frequency and chirp parameters of the input sinusoidal signal so that the demodulated chirp is visible in the frequency domain of the sampled data. The bandwidth of the chirp is estimated from the power spectrum of the demodulated waveform. The center of the chirped waveform is also determined. Assuming that $f_1$ is the lower frequency and $f_2$ is the upper frequency of the bandwidth, the average frequency is typically used for the center. These values are used to determine a new starting frequency and chirp parameter for the next complex demodulation. The new chirp parameter is given by Equation (14) below:

$$\Delta \alpha = \frac{f_2 - f_1}{T_{obs}} \tag{14}$$

where:

$T_{obs}$ is the total observation time.

If one chooses a new starting frequency given by Equation (15) below:

$$\Delta f_0 = \frac{(f_2 - f_1)}{2} + \frac{\Delta \alpha}{2} \tag{15}$$

the second complex-heterodyne will be centered on DC.

As discussed above, either another demodulation with a complex-heterodyne of the form $h(t) = e^{i\Delta\omega_0 t + \Delta\alpha t^2}$ on the demodulated data can be performed or the initial frequency and chirp parameters can be adjusted and the original signal demodulated again. These are equivalent because the phase shifts of the complex demodulation is additive. It is helpful to use both positive and negative frequencies during this process because, in general, the chirp can be moved into the negative frequency domain. The negative frequencies are unique and contain different information than the positive frequency components after a complex-heterodyne.

After a few iterations, the complex-heterodyne will demodulate all of the signal power into one bin near DC. Note that one bin of frequency is given by the inverse of the observation time $$f_{1bin} = \frac{1}{T_{obs}}.$$

At every step, the amplitude of the power spectrum increases because more of the power is concentrated in fewer and fewer bins.

This complex-heterodyne process can be extended to frequency adjustments that are smaller than one bin. In this case, one must realize that the location of the zero frequency and chirp within the zero bin both cause leakage into the other components due to the finite observation time. The signal power will be maximized when the start frequency and chirp are matched exactly and the leakage to the other components is eliminated.

Once the initial frequency and chirp parameters have been determined to within one frequency bin, a nonlinear fit in the time domain is performed. The data can be fit to a model function M(t) given by Equation (16) below:

$$M(t) = q_0 \cos(q_2 t + q_3 t^2) + q_1 \sin(q_2 t + q_3 t^2) \tag{16}$$

where the sinusoidal waveform has been broken into sine and cosine components so that the amplitudes $q_0$ and $q_1$ are linear functions. The starting frequency $q_2$ and the chirp $q_0$ are non-linear parameters that must be estimated using non-linear least squares. The standard method fits a Taylor expansion of the model function around estimates of the parameters $q_i$.

The function S(t) below represents the sampled data and the model function M(t) is the chirped sinusoid that is being fit to the data:

$$S(t) - M(t, q_t) = \sum_i \frac{\partial M(t)}{\partial q_i} \Delta q_t \tag{17}$$

The complex-heterodyne provides very good initial estimates for all of the parameters. The starting frequency and chirp will be given to within one bin, and the starting phase used for the sine and cosine amplitudes can be estimated from the phase of the DC component after all of the signal power has been fully demodulated to one bin.

Matching the initial frequency and chirp to one bin is desired to ensure convergence of the non-linear least squares fit. If the initial estimates for the model differ from the actual values by more than one bin, the phase error will exceed $2\pi$ during the observation time, and the least-squares will not converge. The non-linear least-squares typically converges in 2-3 iterations using the phase, initial frequency, and chirp parameters derived by the complex-heterodyne technique described above.

EXAMPLE I

Figure 8:
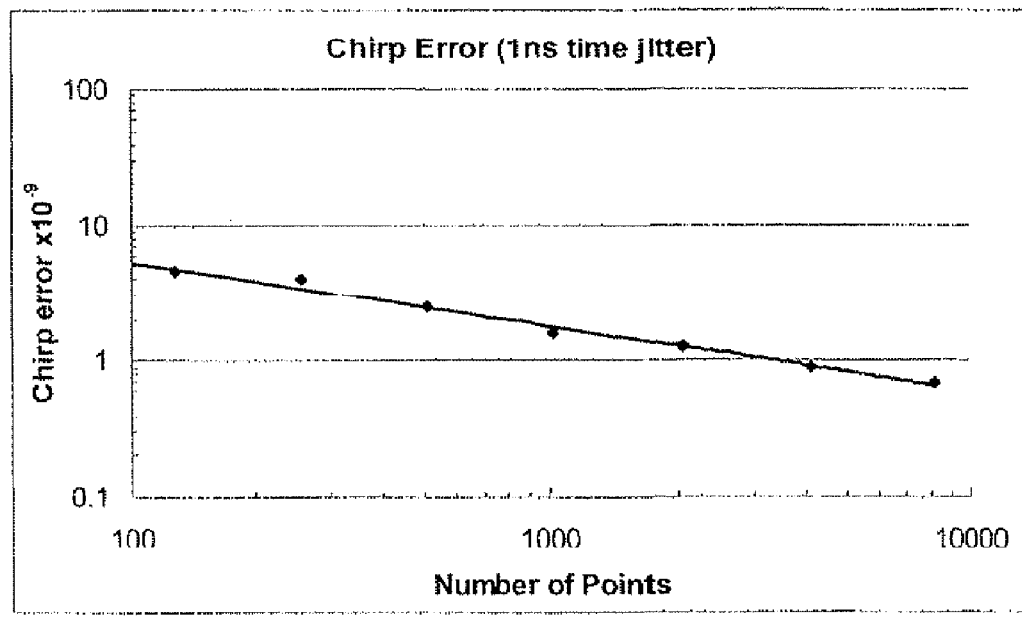
FIG. 8 is a chirp error signal caused by 1 ns of time jitter as a function of the number of samples.

The robustness of the above complex-heterodyning technique was tested in computer simulations by adding noise to both the amplitude and then the phase of the sampled data. A series of data were created, each using a chirped sinusoidal waveform starting at zero frequency and ending at 6 MHz and lasting 0.2 s. White noise of up to 1 ns was added to each time used to calculate the chirped sinusoidal waveform given by Equation (2) to simulate jitter. FIG. 8 shows the error on the estimated value of the chirps as a function of the number of sample points. Because the data were sampled over 0.2 s, the sampling frequency is given by multiplying the number of points by 5 Hz. The data in FIG. 8 fit the empirical Equation (18) below:

$$\frac{\delta chirp}{\text{chirp}} = \frac{10}{\sqrt{N}} \frac{\delta t_{jitter}}{T_{obs}} \quad (18)$$

where:

$T_{obs}$ is the observation time.

This graph and formula show that about 3000 points should be used if the chirp parameter precision is desired to about 1 part in $10^9$ (1 ppb). This is the typical minimum threshold required for an absolute gravity meter. Typically though another factor of 10 is desired, which means it is either necessary to increase the sample rate by 100, or decrease the jitter by a factor of 10 (0.1 ns).

Figure 9:
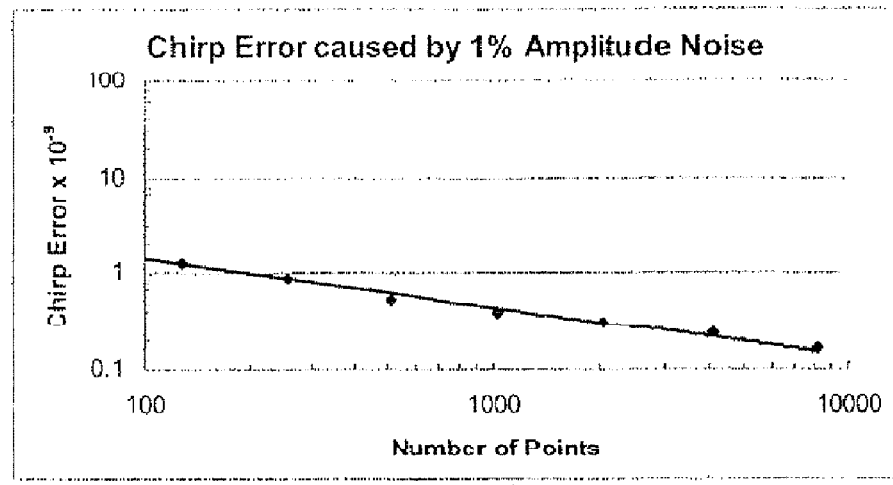
FIG. 9 is a chirp error signal caused by 1% amplitude noise.

To investigate the effect of amplitude noise, 1% white noise was added to the amplitude of the same chirped sinusoidal signal (DC to 6 MHz in 0.2 s). Complex-heterodyning followed by a non-linear least-squares fitting was performed to determine the chirp. The resulting errors are shown in FIG. 9 as a function of the number of sample points. As before, the sampling frequency is given by multiplying the number of points by 5 Hz.

The noise was found to be linear in the amplitude (for amplitude noise below 10%) and fits the empirical Equation (19) given by:

$$\frac{\delta chirp}{\text{chirp}} = \frac{140 \times 10^{-9}}{\sqrt{N}} \frac{\delta A}{A} \quad (19)$$

This indicates that if the amplitude noise is below 1%, the chirp can be determined to about 1 part in $10^9$ (~1 ppb) using about 200 points assuming that the time jitter is below 0.1 ns.

EXAMPLE 11

Figure 10:
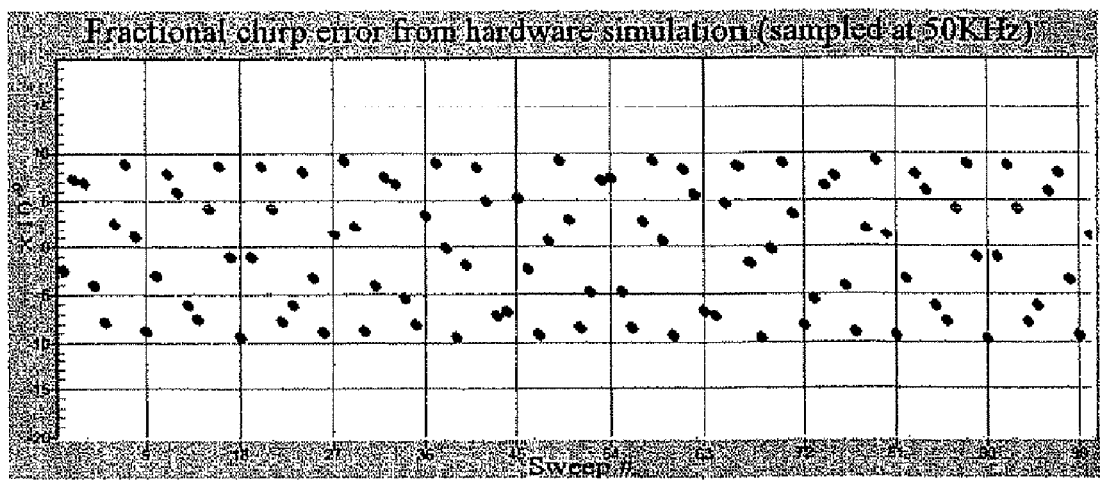
FIG. 10 is a plot of the fractional error in the estimated chirp value of a hardware generated chirped sinusoidal waveform under-sampled and analyzed using complex-heterodyning compared to the value programmed in a function generator.

The complex-heterodyning technique followed by a non-linear fit in the time domain was also tested using computer-simulated data. In order to provide a hardware test, an inexpensive function generator (SRS DS345) was programmed to produce a frequency chirped sinusoidal waveform similar to the described previously that sweeps from DC to 6 MHz in 0.2 s. A rubidium clock (LPRO from Symmetricom) was used as an external time base for the function generator. The time base was also used to generate a sampling clock using a generic 16 bit counter to divide the 10 MHz rubidium clock to 50 kHz. A 12-bit 50 MHz A/D PCI card from Gage Applied Technologies (Compuscope 1220) was used to under-sample the waveform at 50 kHz. FIG. 10 shows the result of 100 sweeps from the function generator. 8,192 ($2^{13}$) saplvples for each sweep were collected so that the FFTs were efficient to compute. The complex-heterodyning technique followed by a least-squares fit was used to determine the chirp parameters. The analysis took about 0.1 s per Sweep on a generic PC Pentium IV personal computer.

The upper frequency was determined by the data to be 6,000,000.03502±0.04 MHz at 0.2 s. The scatter on the chirp parameter was given by $\sigma = 6.67 \times 10^{-9}$ Hz$^2$ and the chirp parameter was consistent with the programmed value to 7 parts in $10^9$. The results are of similar accuracy and precision when compared to those achieved using the zero-crossings method. The error on the chirp, is probably due to the function generator, which has a limited rise time of 35 ns for its arbitrary waveform generation.

As will be appreciated, the method and apparatus for analyzing chirped sinusoidal signals using a complex-heterodyne described herein is robust and works even when the data stream is sampled well below the Nyquist criterion, or has significant amplitude and/or phase noise. Basically any type of frequency-chirped signal that can be generated in many different applications can be analyzed. The chirped signal is digitally under-sampled and then repeatedly demodulated using a series of complex-heterodynes. A complex-heterodyne is used to avoid the problem of mixing mirror frequency noise and signals. The complex-heterodyning eventually demodulates all of the signal power into one frequency bin in the time domain. This process can be continued until the maximum signal power is found in the frequency domain. Alternatively a non-linear least squares fitting in the time domain can be performed once the initial frequency and chirp parameters are found using complex-heterodyning.

The method and apparatus is suitable for use with the optical signal that is generated by a Michelson-type or Mach-Zender-type interferometer with one freely falling arm such as that shown in FIG. 1. Sampling rates of more than 1000 times lower than have been used in the past to fit similar chirped waveforms for absolute gravity meters can be realized.

When compared with the more traditional approach of analyzing the zero-crossings in the time domain, the complex-heterodyne technique described herein has the advantage that the data are equally sampled in the time domain which can make it easier to recognize sources of systematic error. Less expensive hardware can be used than is needed for the zero-crossing method. Another advantage of using an A/D sampled waveform is that excess noise will only cause an increased uncertainty, whereas it can cause highly problematic double-triggering in the zero-crossing method.

The complex-heterodyning technique is also useful in environments where permanent detectors are employed to monitor events that are not predictable (i.e. earthquake monitoring, supernova research, etc.). In these cases, a very high data rate can be impractical from a data storage point of view (for a high number of sensors and/or a high bandwidth). Moreover, if the event is short lived, or difficult to identify, then it is often impossible to increase the signal rate in time to monitor the event. The complex-heterodyne technique allows one to post-process under-sampled data acquired by an array of sensors in response to such an event allowing the data to be effectively analyzed even if the signal bandwidth is much higher than the sampling frequency. In this case, the complex-heterodyne can either be used to analyze under-sampled waveforms in real-time, or as a forensic research tool to analyze acquired data after the event.

Although the specific examples discussed above are made with reference to the interference signal generated by an absolute gravity meter, as previously stated, the data processing may be used to analyze data acquired by under-sampling a chirped sinusoidal waveform generated in any interferometer application such as a wave meter, absolute gravity meter etc. or a chirped sinusoidal waveform transmitted into the ground such as in seismic and surveying applications. In fact, the data processing may be employed in basically any application where it is required to analyze data acquired by under-sampling a chirped sinusoidal waveform.

Although preferred embodiments have been described, those of skill in the art will appreciate that variations and modifications may be made without departing from the spirit and scope thereof.

APPENDIX A

Figure 11:
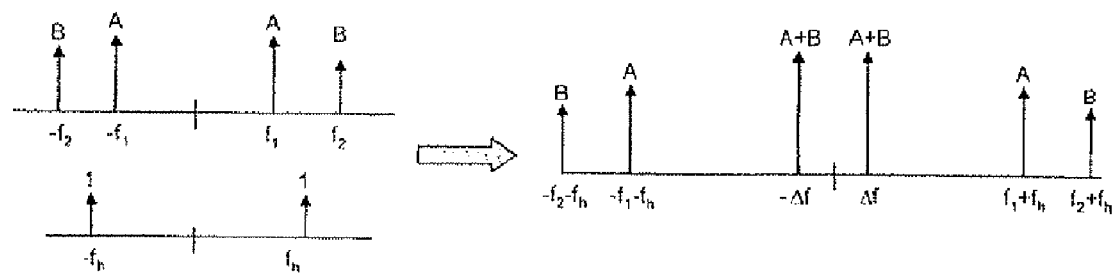
FIG. 11 is a real heterodyne effect on mirror frequencies.

Consider the case of a signal S(t) with two frequencies $f_1$ and $f_2$ given by:

$$S(t)=2A\cos(\omega_1 t)+2B\cos(\omega_2 t)=A(e^{i\omega_1 t}+e^{-i\omega_1 t})+B(e^{i\omega_2 t}+e^{-i\omega_2 t})$$

and a heterodyne function h(t) given by:

$$h(t)=2\cos(\omega_h t)=e^{i\omega_h t}+e^{-i\omega_h t}$$

where the heterodyne frequency, $f_h$, is exactly midway between the two frequencies, $f_1$ and $f_2$, of the signal function. The difference between the heterodyne frequency and either frequency in the signal is denoted by $\Delta f=f_h-f_1=f_2-f_h$. A real heterodyne is accomplished by multiplying the heterodyne and signal functions in the time domain. This is equivalent to a convolution of the two functions in the frequency domain. FIG. 11 shows the convolution of the signal and real heterodyne that is exactly between the two frequencies of the signal. The mirror frequencies are both shown to be downconverted to the frequency $\Delta f$, but unfortunately both mirror frequencies down-convert to the same value and cannot be separated after the heterodyne. The mirror frequencies are mixed because the convolution combines the positive frequency component of the heterodyne with one of the positive frequency components, $f_2$ ($f_1$) while the negative frequency component of the heterodyne overlaps the other negative frequency, $f_1$ ($f_2$) at the frequency $\Delta f$ or $-\Delta f$. For clarity, the amplitude of the mixed mirror frequencies is shown as larger than the initial amplitudes of either mirror frequency in the figure, but of course the two amplitudes could also tend to cancel each other.

Figure 12:
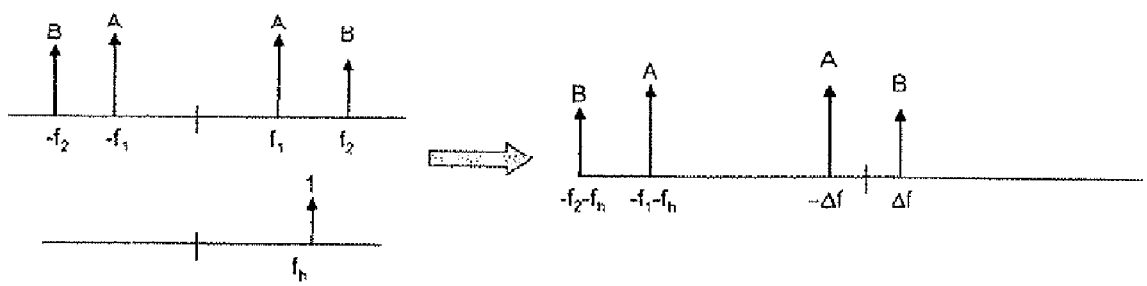
FIG. 12 is a complex-heterodyne effect on mirror frequencies.

The frequency domain suggests that the solution to the problem of mixing mirror frequencies is to remove the negative frequency component of the heterodyne signal. By using a complex-heterodyne function, this mixing of the mirror frequencies of the signal can be avoided. FIG. 12 shows the effect of a using complex-heterodyne signal made with only one positive frequency component. The convolution is seen to result in a pure shift of the frequency domain by the heterodyne frequency; the mirror frequency components are no longer combined.

Figure 13:
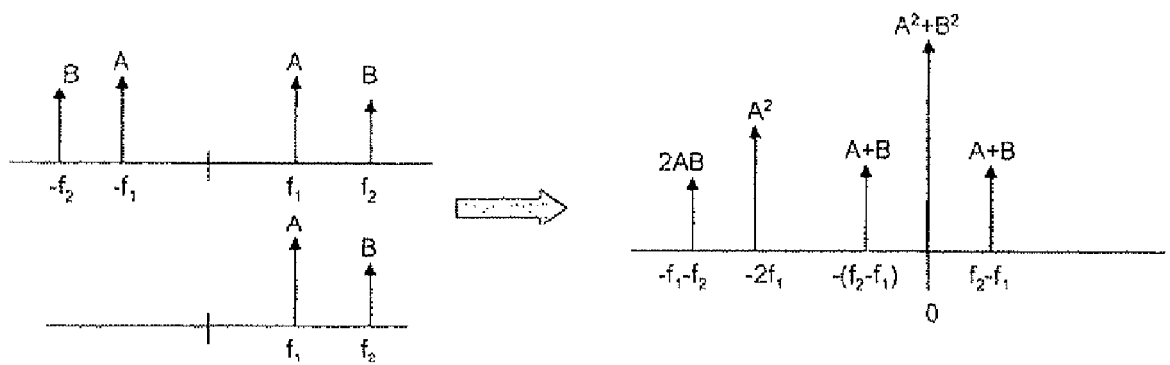
FIG. 13 is a matched complex-heterodyne.

The complex-heterodyne can be used to demodulate all of the signal power to DC (zero frequency), if the complex-heterodyne is "matched" to the signal in the frequency domain. FIG. 13 shows that all of the signal power is demodulated to DC. The signal power of each frequency component is squared and then added at DC so that no cancellation occurs. This procedure provides the best signal-to-noise possible in the presence of random white noise because the entire signal is demodulated into one bin while the corresponding noise in that bin is given by a random mix of the noise at each component. This shows the principle of using a matched filter for optimal signal detection.

The complex-heterodyne avoids the problem of mixing mirror frequencies that can occur in a real heterodyne if the heterodyne signal is not perfectly matched to the signal. In this case, where the heterodyne frequencies and amplitudes match those of the signal, the full signal power is demodulated to DC.

What is claimed is:

1. A method of processing data acquired by under-sampling a chirped, sinusoidal waveform comprising:
    complex-heterodyning the under-sampled data using a processor with a chirped signal having characteristics similar to said sinusoidal waveform to generate a demodulated signal; and
    analyzing the demodulated signal using the processor to determine characteristics of the sinusoidal waveform, wherein said chirped sinusoidal waveform is an interference signal S(t) of the form:

$$S(t)=A\cos\left(\omega_0 t+\frac{1}{2}\alpha t^2\right)$$

where:
    $\omega_0$ is the initial frequency of the interference signal; and
    $\alpha$ is the chirp of the interference signal, wherein during said analyzing the initial frequency and chirp of the sinusoidal waveform are determined.

2. The method of claim 1 wherein said demodulated signal is further processed to refine the determined initial frequency and chirp of the sinusoidal waveform.

3. The method of claim 2 wherein during further processing, a least squares fit is used to refine the determined initial frequency and chirp of the sinusoidal waveform.

4. The method of claim 2 wherein during further processing, the demodulated signal is complex-heterdyned at least one additional time to refine the determined initial frequency and chirp of the sinusoidal waveform.

5. The method of claim 4 wherein complex-heterodynes are applied to the demodulated signal in an iterative loop to refine the determined initial frequency and chirp of the sinusoidal waveform.

6. The method of claim 1 further comprising under-sampling the chirped sinusoidal waveform below Nyquist prior to said complex-heterodyning, wherein said complex-heterodyning is performed on said under-sampled data as said under-sampled data is acquired.

7. The method of claim 6 wherein said chirped sinusoidal waveform is a ground propagating signal used in one of a surveying and seismic application.

8. The method of claim 6 wherein said demodulated signal is further processed to refine the determined initial frequency and chirp of the sinusoidal waveform.

9. The method of claim 1 wherein the complex-heterodyning is performed on under-sampled data read from memory, said under-sampled data being acquired below Nyquist.

10. The method of claim 9 wherein said demodulated signal is further processed to refine the determined initial frequency and chirp of the sinusoidal waveform.

11. The method of claim 2 wherein the chirped sinusoidal waveform is generated in an interferometer application.

12. The method of claim 11 wherein said interferometer application is one of a gravity meter and wave meter.

13. A signal processor for processing under-sampled data extracted from a chirped sinusoidal waveform comprising:
    a multiplier multiplying the under-sampled data with a chirped signal having characteristics similar to said sinusoidal waveform to generate a demodulated signal; and
    a signal analyzer analyzing the demodulated signal to determine selected characteristics of the sinusoidal waveform, wherein said chirped sinusoidal waveform is an interference signal S(t) of the form:

$$S(t) = A\cos\left(\omega_0 t + \frac{1}{2}\alpha t^2\right)$$

where:
$\omega_0$ is the initial frequency of the interference signal; and
$\alpha$ is the chirp of the interference signal, said signal analyzer determining the initial frequency and chirp of the sinusoidal waveform.

14. A signal processor according to claim 13 embodied in an interferometer device.

15. A signal processor according to claim 14 wherein said interferometer device is one of a gravity meter and wave meter.

16. A signal processor according to claim 13 wherein the multiplier multiplies the under-sampled data with a complex-heterdyne in real-time as said under-sampled data is extracted.

17. A signal processor according to claim 13 wherein the under-sampled data is read by said multiplier from memory.

18. A method of extracting selected characteristics of a chirped, sinusoidal waveform comprising:
under-sampling the sinusoidal waveform below Nyquist in the absence of an anti-aliasing filter having a bandwidth generally at the typical cut-off rate; and
processing the under-sampled data with a processor using at least one complex-heterodyne to determine said selected characteristics, wherein said chirped sinusoidal waveform is an interference signal S(t) of the form:

$$S(t) = A\cos\left(\omega_0 t + \frac{1}{2}\alpha t^2\right)$$

where:
$\omega_0$ is the initial frequency of the interference signal; and
$\alpha$ is the chirp of the interference signal, wherein during said processing the initial frequency and chirp of the sinusoidal waveform are determined.

19. The method of claim 11 wherein during further processing, a least squares fit is used to refine the determined initial frequency and chirp of the sinusoidal waveform.

20. The method of claim 11 wherein during further processing, the demodulated signal is complex-heterdyned at least one additional time to refine the determined initial frequency and chirp of the sinusoidal waveform.

21. The method of claim 20 wherein complex-heterodynes are applied to the demodulated signal in an iterative loop to refine the determined initial frequency and chirp of the sinusoidal waveform.

22. The method of claim 1 wherein said chirped sinusoidal waveform is a ground propagating signal used in one of a surveying and seismic application.

23. The method of claim 8 wherein during further processing, a least squares fit is used to refine the determined initial frequency and chirp of the sinusoidal waveform.

24. The method of claim 8 wherein during further processing, the demodulated signal is complex-heterdyned at least one additional time to refine the determined initial frequency and chirp of the sinusoidal waveform.

25. The method of claim 24 wherein complex-heterodynes are applied to the demodulated signal in an iterative loop to refine the determined initial frequency and chirp of the sinusoidal waveform.

26. The method of claim 10 wherein during further processing, a least squares fit is used to refine the determined initial frequency and chirp of the sinusoidal waveform.

27. The method of claim 10 wherein during further processing, the demodulated signal is complex-heterodyned at least one additional time to refine the determined initial frequency and chirp of the sinusoidal waveform.

28. The method of claim 27 wherein complex-heterodynes are applied to the demodulated signal in an iterative loop to refine the determined initial frequency and chirp of the sinusoidal waveform.

* * * * *